H. P. TAYLOR.
AUTOMOBILE TRANSMISSION LOCK.
APPLICATION FILED NOV. 30, 1917.
1,281,705.
Patented Oct. 15, 1918.
2 SHEETS—SHEET 1.
Fig. 1
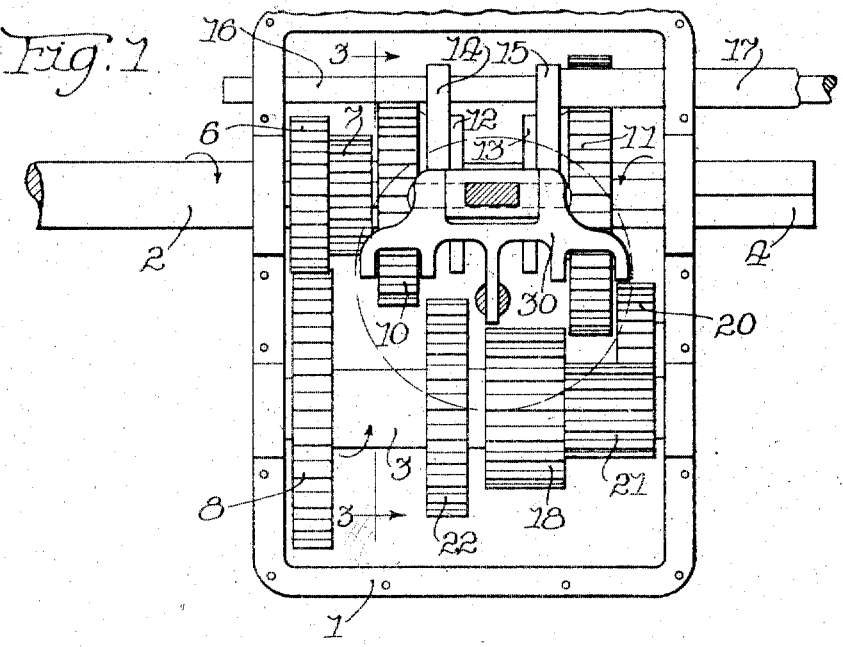
Fig. 2
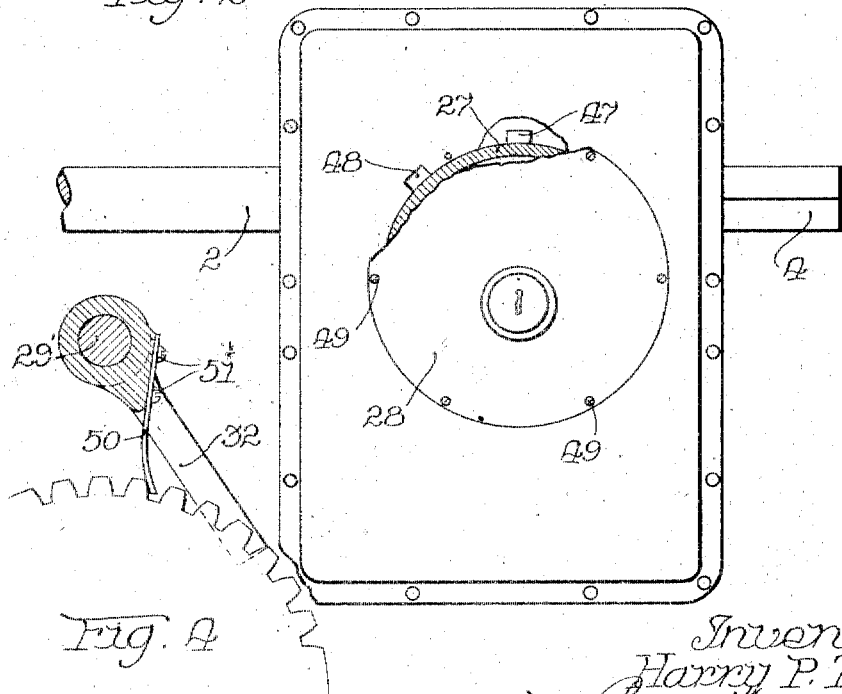
Fig. 4
Inventor
Harry P. Taylor
By Brown, Hanson & Boettcher
Attorneys

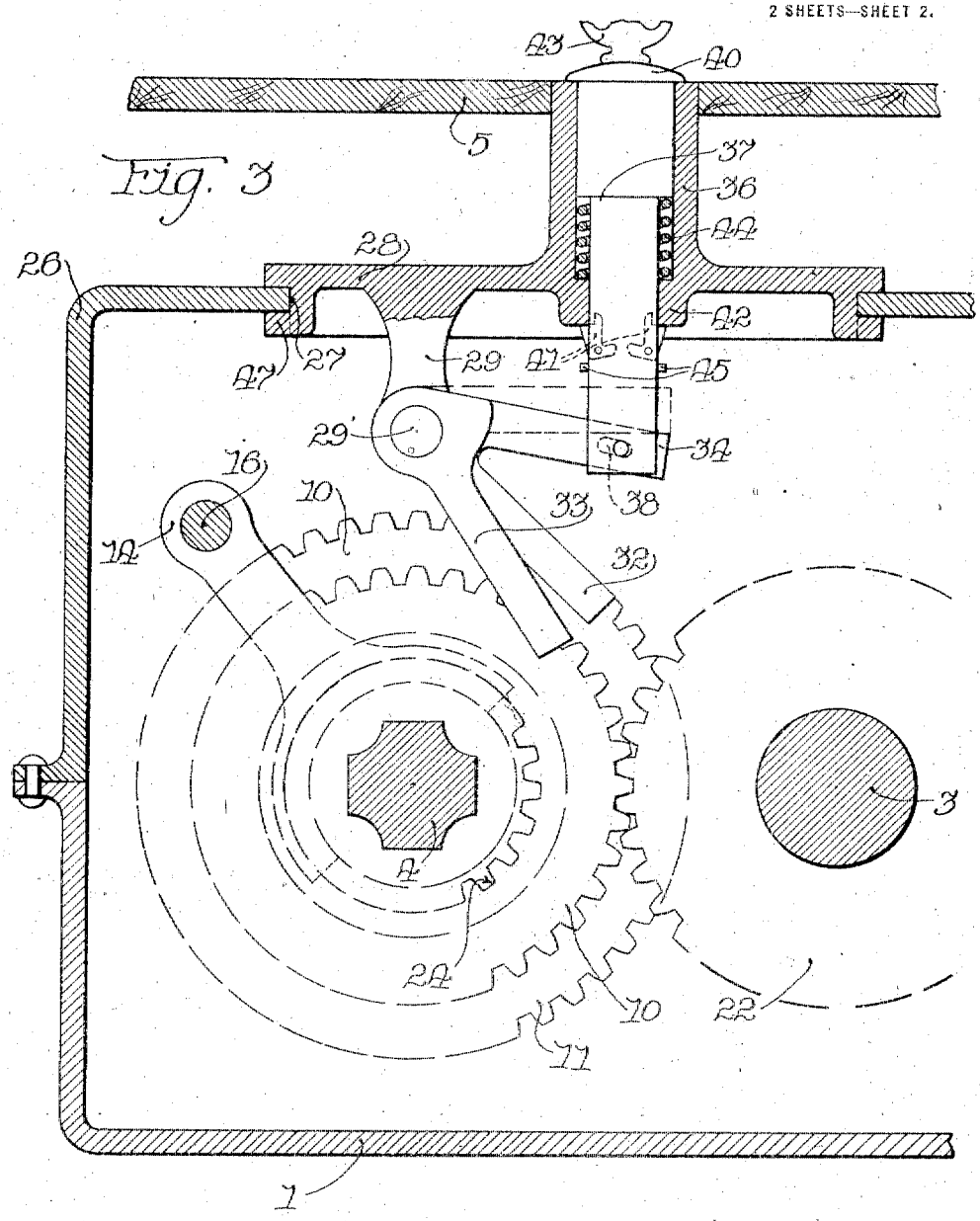

UNITED STATES PATENT OFFICE.

HARRY P. TAYLOR, OF LOS ANGELES, CALIFORNIA.

AUTOMOBILE-TRANSMISSION LOCK.

1,281,705. Specification of Letters Patent. Patented Oct. 15, 1918.

Application filed November 30, 1917. Serial No. 204,537.

*To all whom it may concern:*

Be it known that I, HARRY P. TAYLOR, a citizen of the United States, residing at Los Angeles, in the county of Los Angeles and State of California, have invented a certain new and useful Improvement in Automobile-Transmission Locks, of which the following is a full, clear, concise, and exact description, reference being had to the accompanying drawings, forming a part of this specification.

My invention relates to automobile transmission locks.

Numerous locks have been devised for locking the transmission mechanism of automobiles to safeguard them against theft, some adapted to lock the transmission controls and some adapted to operate within the transmission housing in direct engagement with the transmission gearing.

The principal objections to applying the lock to the transmission control have been that the lock is so exposed and accessible that it can be easily broken by the thief and also that the lock can be readily circumvented by disconnection of some of the links and connections between the controls and transmission gearing, whereby the transmission gearing can be operated irrespective of the locked condition of the controls. The principal objection to incorporating the lock directly in the transmission housing has been the difficulty and expense of installation, often necessitating extensive alteration of the transmission housing to include all the parts of the locking mechanism therein.

My lock is of the latter type, that is, inclosed within the transmission housing, but its installation can be quickly and easily performed without any alteration of the transmission housing and without necessitating the aid of skilled labor. In this particular it lends itself admirably to manufacture and sale as an accessory, as it can be installed by the car owner himself.

A further improvement consists in the manner of mounting the lock and connected parts on the cover plate of the gear casing so that even if the holding screws be released it will be impossible to remove the lock while it is in the locked or set position.

The lock is intended to lock the transmission gears in neutral, though it might be otherwise arranged, so that the car may be pushed a short distance as from in front of a building or out of the way, in order to comply with fire and traffic ordinances prohibiting the practice of locking a car immovably. Compliance with this requirement, namely, leaving the car free to be moved permits it to be towed away by automobile thieves and as a deterrent thereto I contemplate the provision of an alarm arranged to be automatically sounded when the car is moved with the lock set, according to the invention described and claimed in my copending application, Serial No. 174,727, filed June 14th, 1917.

In the appended drawings in which I have illustrated one particular embodiment of my invention,—

Figure 1 is a plan view of a transmission housing with the cover removed, showing my improved lock in operative position;

Fig. 2 is the same view with the cover in place;

Fig. 3 is a section taken on line 3—3 of Fig. 1; and

Fig. 4 is a fragmentary section through one of the locking forks showing the alarming member applied thereto.

The transmission herein shown and described is not to be considered as the only transmission to which my lock is applicable, but as merely illustrative of the general arrangement within a typical sliding gear transmission.

As shown in Fig. 1, the lower half 1 of the transmission housing supports the clutch shaft 2, the countershaft 3 and the stubshaft 4. The stubshaft is formed with a square end for the attachment of a suitable coupling. The stubshaft 4 connects through a suitable universal joint with the propeller shaft of the car which moves whenever the wheels are moved.

The transmission housing is usually situated immediately behind the clutch and directly under the floor board 5 (Fig. 3) of the front compartment of the car.

The clutch shaft 2 drives the two pinions 6 and 7, the former of which is in constant mesh with the large gear 8 and drives the countershaft therethrough.

The two gears 10 and 11 are mounted for longitudinal movement on the stubshaft 4 being splined thereto and have hubs or collars 12 and 13 integrally formed thereon which are embraced by the shifting forks 14 and 15.

The shifting forks 14 and 15 are adapted to be reciprocated by means of the shaft 16 and sleeve 17, respectively to which they are attached. The shaft 16 and sleeve 17 are arranged to be independently actuated from a transmission control lever.

Movement of the gear 11 to the left (Fig. 1) meshes the same with the pinion 18, rigidly mounted on the countershaft 3 and drives the car at low speed forward. Movement of this same gear to the right meshes it with the idler pinion 20 which is driven from the pinion 21 on the countershaft and drives the car in the reverse direction.

Movement of the other shiftable gear 10 to the right meshes it with the gear 22, which is rigidly mounted on the countershaft 3 and places the car in second speed forward. The left hand face of the gear 10 has cut therein an internal gear 24 (see Fig. 3) which when the gear 10 is shifted to the left is adapted to mesh with the pinion 7 which is fast on the clutch shaft 2. The engagement of the gears 7 and 24 places the clutch shaft 2 and stubshaft 4 in direct drive, resulting in high forward speed of the car.

Referring to Fig. 3, the upper portion 26 of the transmission housing is provided with a circular opening 27 therethrough, over which sits the disk cover 28. This disk is bolted or otherwise fastened on the housing. The opening 27 and disk cover 28 has interlocking lugs and slots for preventing unauthorized removal of the disk cover 28, which will be hereinafter described. Integrally formed on the under side of the disk cover 28 is the inverted pedestal bearing 29 which projects down adjacent the shiftable gears 10 and 11 and has pivoted at its end the fork member 30. The formation of this fork member will be apparent from inspection of Fig. 1. It comprises two end hubs, the locking forks 32—33 and the actuating arm 34, joined to the forks 32 and 33 by a lateral web portion.

The end hubs of the member embrace the ends of the pedestal bearings 29 and are pivoted thereto by the pin 29'.

Integrally formed on the upper side of the disk cover 28 is the hollow boss 36 which is arranged to project up through an aperture in the floorboard 5 and terminate practically flush with the upper surface of the floor board. A plunger 37 is arranged for reciprocation in this hollow boss and has its lower end bifurcated for a pin and slot connection 38 with the actuating arm 34 of the fork member 30. The enlarged upper portion 40 of the plunger 37 contains a pin and tumbler lock of the Yale type which is adapted to control through the medium of a cam shaft extending down through said plunger, the position of small locking pawls 41. The plunger is keyed against rotation in the boss 26. The particulars of this lock are fully described in my copending application, Serial No. 174,727 filed June 14th 1917 and inasmuch as they are not pertinent to the present application, no description thereof will be made. Suffice it to say that the pawls 41 are normally within the confines of the plunger 37 and when the plunger is depressed the pawls are thrown out by suitable spring means and come into engagement with the under edge of the guiding hub 42, as shown in Fig. 3, locking the plunger in that position. Insertion of the proper key 43 into the lock portion 40 enables the pawls 41 to be retracted within the confines of the plunger 37, through the rotation of the cam shaft previously referred to and permits retrograde movement of the plunger 37 under the action of the compression spring 44 confined in the boss 36 between the reduced guiding hub 42 and the enlarged locked portion 40. Action and operation of the lock will now be briefly summarized. To lock the transmission, the driver of the car first manipulates his transmission control lever to place the shiftable gears 10 and 11 in neutral position as shown in Fig. 1. Thereupon he depresses the plunger 37 with his foot until the locking coils 41 engage the lower edge of the guiding hub 42 and forthwith the transmission is locked. The depressing of the plunger 37 revolves the arm 34 and locking forks 32 and 33 down to their full line position, shown in Fig. 3. In this position the forks 32 and 33 are embracing their respective gears 10 and 11, positively preventing any shifting movement of the same. The spacing between the tines or arms of the locking forks 32—33 is made just sufficient to afford a very slight clearance between the arms of the forks and the sides of the gear. This insures that the gears are and will remain in neutral when the lock is set. An effort to set the lock with one of the gears out of neutral results in one of the arms of that associated fork engaging the toothed periphery of the gear before the plunger reaches the bottom of its stroke, and accordingly the plunger will not lock and springs back when the driver removes his foot, thus apprising him that the transmission is not entirely in neutral.

To unlock the transmission the proper key 43 is inserted in the locked portion 40 and turned. This draws the locking pawls 41 within the plunger 37, permitting upward movement of the plunger by the compression spring 44 and rotates the locking forks 32 and 33 up into a position clearing the shiftable gears 10 and 11. A stop pin 45 extends transversely through the plunger 37 and limits the upward movement of the plunger by its engagement with the guiding hub 42.

From the foregoing it will be apparent that when the locking forks 32 and 33 embrace the shiftable gears 10 and 11, the disk cover 28 will be held against rotation through the fork member 30 and the inverted pedestal bearing 29. This condition is utilized by locking the disk cover 28 to the upper housing portion 26. Referring to Figs. 2 and 3, the disk cover 28 is provided with a plurality of lugs 47, depending from the under side thereof and adapted to cooperate with a corresponding number of slots 48 cut in the periphery of the circular opening 27. In applying the disk cover 28 the lugs 47 are passed down through the slots 48. The cover is then revolved a pre-arranged distance determined by the coincidence of the threaded holes for the screws 49, which are then inserted and drawn up. The relation of parts is such that in this position the locking forks 32 and 33 are directly over the shiftable gears for locking engagement therewith and the lugs 47 are midway between adjacent slots 48. When the locking forks 32 and 33 are in locking engagement with the gears 10 and 11 the disk cover 28 is obviously prevented from turning and by the engagement of the hook-shaped lugs 47 with the solid peripheral portion of the opening 27, the removal of the disk cover 27 is absolutely prevented until disengagement of the locking forks 32—33 and gears 10—11 is effected.

Thus even if the fastening screws 49 be loosened the disk cover cannot be removed because the eccentric position of the locking forks 32 and 33 prevents turning of the disk 28 and the lugs 47 cannot be brought into register with the slots 48.

To permit of full advantage of this interlocking, the upper half of the gear casing is riveted or otherwise securely fastened upon the lower half.

Conversely the disposal of the locking forks 32—33 and the pedestal bearing 29 relative to the center of the disk cover 28 prevents turning of the disk cover as by shifting of one of the gears 10 or 11 through operation of the transmission control lever. Moreover, when the forks 32—33 are in locking position, the two gears 10 and 11 are interlocked, so that assuming that it were possible to shift one of the gears slightly, the other gear would necessarily be shifted a corresponding distance, with the result that both gears would lock to the countershaft.

The locking forks 32—33 need not necessarily be supported from the disk cover 28, as they might be pivoted on some shaft constituting part of the standard equipment of the transmission such as the gear shifting shaft 16 or upon a shaft specially located in the transmission housing for that particular purpose.

In Fig. 4 I have illustrated a section through a modified form of locking fork provided with the alarm device to which reference has heretofore been made. This alarm device preferably consists of a flexible tongue or reed 50 secured as by screws or rivets 51 to each locking fork between the arms thereof, and adapted to move down into the path of the teeth of the shiftable gear when the fork is revolved to embrace the gear. The two gears 10 and 11 always rotate in unison with the propeller shaft of the car and thus if the car is moved when the transmission lock is set, the teeth on these gears will set up a rapid flexing of their respective reeds 50 and audibly signal the fact that the car is not in authorized hands.

I do not intend to be limited to the particular use of a tongue or reed as a bell, diaphragm or any sound producing element might be equally well employed.

I claim:

1. The combination with a sliding gear transmission having one or more shiftable gears, of a housing inclosing said transmission, a cover on said housing, a locking fork for engaging one of said shiftable gears, said locking fork being pivoted to said cover, key releasable locking means supported on said cover and connected to said locking fork.

2. The combination with a sliding gear transmission having one or more shiftable gears, of a housing inclosing said transmission, a cover on said housing, a locking fork for one of said shiftable gears, said locking fork being pivoted to said cover, key releasable locking means supported on said cover and connected to said locking fork, said locking means being operable to place said locking fork in locked engagement with said shiftable gear, and means for preventing removal of said cover when said fork and said gear are so engaged.

3. The combination with a sliding gear transmission having one or more shiftable gears, of a housing inclosing said transmission a locking member supported from said housing and adapted to engage and hold one of said gears against shifting movement and key releasable locking means supported on said housing and operable to place said locking member in engagement with said shiftable gear.

4. In combination a change speed mechanism having a shiftable wheel, a housing inclosing said mechanism, a holding member within the housing movable to engage the wheel when in a predetermined position, a control member for the holding member outside of the housing and locking means for locking the control member.

5. In combination a change speed mechanism having a movable ratio changing element, a housing inclosing said mechanism, a normally disengaged holding member adapted to be moved into engagement with the ratio changing element when the latter is in a predetermined position, a control member for the holding member outside of the housing, and locking means for holding the control member against movement.

6. In combination a change speed mechanism having a movable ratio changing element adapted to slide in a given line, a casing inclosing said mechanism, a fork for catching said element said fork being movable at right angles to the line of movement of said element, a control element projecting outside of the casing said control element governing said fork and locking means for said control element.

7. The combination with a gear transmission having one or more shiftable gears, of a housing inclosing said transmission, a locking mechanism within said housing comprising a locking fork adapted to embrace one of said shiftable gears to restrain it against shifting movement and key releasable locking means for engaging and disengaging said locking fork with said shiftable gear.

8. The combination with a gear transmission having one or more shiftable gears, of a housing inclosing said transmission and locking mechanism within said housing adapted to engage one of said gears to prevent shifting of the same.

9. The combination with a sliding gear transmission having one or more shiftable gears having means under control of the operator for operatively shifting the gears, of a housing inclosing said transmission, and a fork within said housing operable to engage and lock said shiftable gears in a predetermined position.

10. The combination with a sliding gear transmission having one or more shiftable gears, of a housing inclosing said transmission, a cover for said housing, lugs on said cover adapted to register with slots in said housing to permit removal of said cover, locking members within said housing adapted to engage and lock said gears against shifting movement, and locking means supported on said cover operable to place said locking members in engagement with said shiftable gears, said locking members when thus engaged holding said lugs and said slots out of registration.

11. In a change speed transmission, a housing inclosing said transmission, a cover for said housing, means for locking said cover to said housing, said means being releasable by rotation of said cover and locking mechanism within said housing for locking the change speed transmission in neutral, said locking mechanism when set preventing rotation of said cover.

12. In combination, a housing having a sliding gear transmission therein, a cover on said housing, locking mechanism having a fork for holding one of the slidable gears, said locking mechanism preventing removal of said cover when said fork is in engagement with said gear.

13. In combination, a housing having a sliding gear transmission therein, locking mechanism within said housing comprising a fork adapted to engage and hold one of the gears against shifting movement, and a sound producing member adapted to engage in the teeth of one of said gears when said fork and said gear are in engagement.

14. In combination a housing having a sliding gear transmission therein, locking mechanism within said housing comprising a fork adapted to engage and hold one of the gears against shifting movement, and a reed or tongue adapted to engage in the teeth of one of said gears when said fork and said gear are in engagement.

15. In combination, a housing having a sliding gear transmission therein, a shiftable gear in said transmission, a locking member in said housing and a plunger connected to said locking member and extending through a wall of said housing, said plunger being operable to place said locking member in locking engagement with said shiftable gear.

16. In combination, a change speed mechanism having gears and having a casing inclosing said gears, manual means exterior to the casing for controlling the change speed mechanism, an arm pivoted within said casing, means to move said arm into position to prevent operation of the change speed mechanism and locking means for said latter means.

In witness whereof I hereunto subscribe my name this 20th day of November, A. D. 1917.

HARRY P. TAYLOR.